United States Patent [19]
Hardy

[11] 3,807,186
[45] Apr. 30, 1974

[54] FLUIDIZED FREEZING

[76] Inventor: Kenneth L. Hardy, Rt. 1, Box 468, Snohomish, Wash. 98290

[22] Filed: May 11, 1973

[21] Appl. No.: 359,213

[52] U.S. Cl. .................................. 62/57, 34/57
[51] Int. Cl. ........................................ F25d 17/00
[58] Field of Search ...... 62/57; 34/57 R, 57 A, 57 C

[56] References Cited
UNITED STATES PATENTS

| | | | |
|---|---|---|---|
| 2,223,972 | 12/1940 | Sterling | 62/57 |
| 3,169,381 | 2/1965 | Persson | 62/57 |
| 3,477,242 | 11/1969 | Lamb | 62/57 |
| 3,589,027 | 6/1971 | Seezan | 35/57 C |

Primary Examiner—William J. Wye
Attorney, Agent, or Firm—Graybeal, Barnard, Uhlir & Hughes

[57] ABSTRACT

Food particles are discharged onto a declining first section of an endless foraminous conveyor belt which carries the food particles through a freezing zone in which refrigerated air flows upwardly through the conveyor belt and the food particles. Gravity forces act on the food particles in the declining section, causing them to advance faster than the conveyor belt. This results in a thinning of the product bed in the declining section, making it easier to fluidize the food particles at the start of their progress through the freezing zone.

7 Claims, 5 Drawing Figures

FLUIDIZED FREEZING

BACKGROUND OF THE INVENTION

1. Field of the Invention

This invention relates to the freezing of food particles, and more particularly to a method and apparatus for promoting a proper start to the freezing of food particles in an endless conveyor belt type fluidized freezer.

2. Description of the Prior Art

Examples of known fluidized bed freezers are disclosed by U.S. Pat. No. 2,223,972, granted Dec. 3, 1940 to Henry W. Sterling; by U.S. Pat. No. 3,115,756, granted Dec. 31, 1963 to Milanr Overbye; by U.S. Pat. No. 3,169,381, granted Feb. 16, 1965 to Per-Oskar Persson and by U.S. Pat. No. 3,477,242, granted Nov. 11, 1969.

Each of these patents discloses delivering food particles onto a perforated support and passing freezing air upwardly through the support to contact and freeze the particles before they leave the freezer. The aforementioned U.S. Pat. Nos. 2,223,972; 3,115,756 and 3,477,242 disclose freezers in which the perforated support is a foraminous conveyor belt which carries the food particles through the freezing zone.

The main object of this invention is to provide a method and apparatus for enhancing the chances of achieving immediate fluidization of all of the food particles, so that good food particle movement and good heat transfer between the food particles and the refrigerated air are achieved from the start.

SUMMARY OF THE INVENTION

According to the present invention, the upper run of the foraminous conveyor belt is divided into a declining first section and a substantial horizontal second section. This is done so that gravity forces acting on the food particles in the first section will cause the food particles to advance faster than the conveyor belt, resulting in a thinning of the fluidized food particle bed in the first section, to in that manner reduce the amount of fluid pressure required to initiate fluidization of the food particles.

At the end of the declining section the velocity of each food particle is reduced to the velocity of the conveyor belt. This results in an increase in depth of the fluidized food particle bed. At this point an increase in bed depth is desirable. The surfaces of the food particles are frozen, making the food particles easier to fluidize. An increase in bed depth means an increase in the freezing rate or capacity of the freezer.

Other features of the invention are set forth in the following description of a typical embodiment of the invention in which reference is made to the accompnaying drawing.

DESCRIPTION OF THE PREFERRED EMBODIMENT

Figure 1:
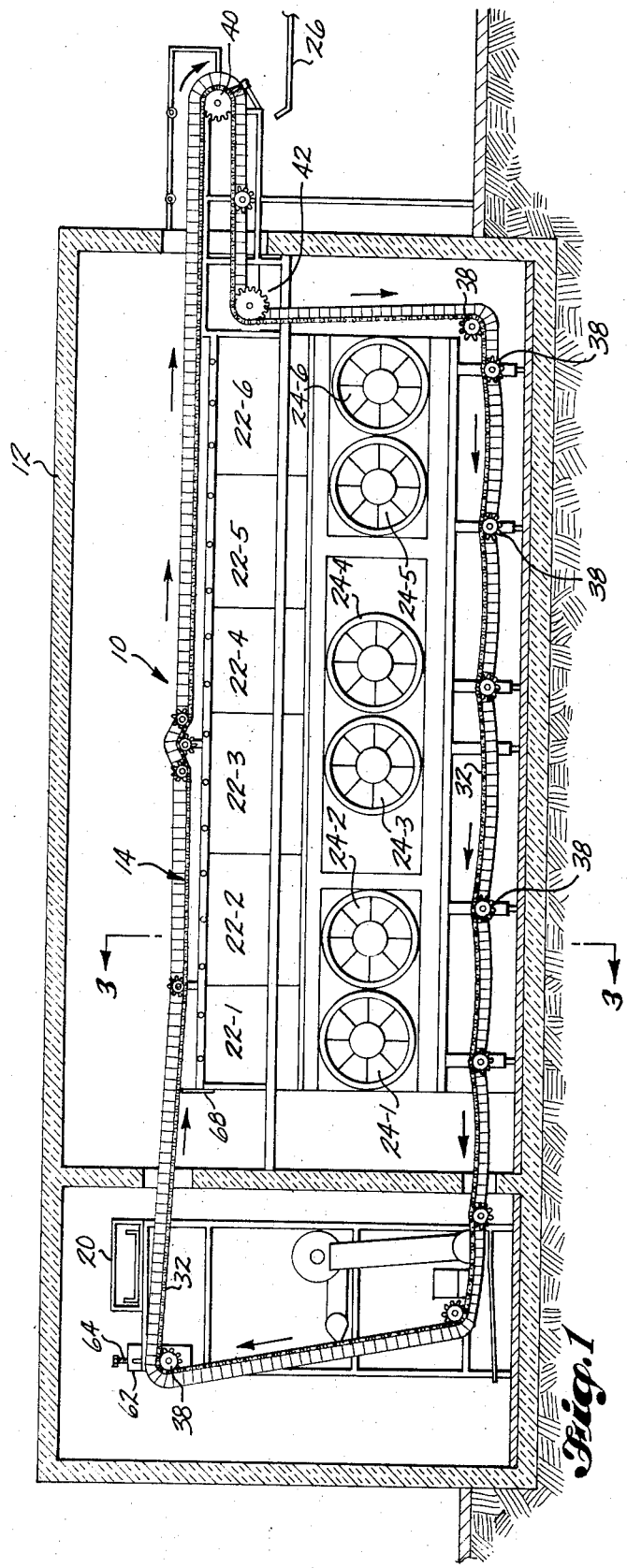
FIG. 1 is a longitudinal sectional view of a continuous belt type fluidized freezer embodying features of the present invention.
Figure 2:
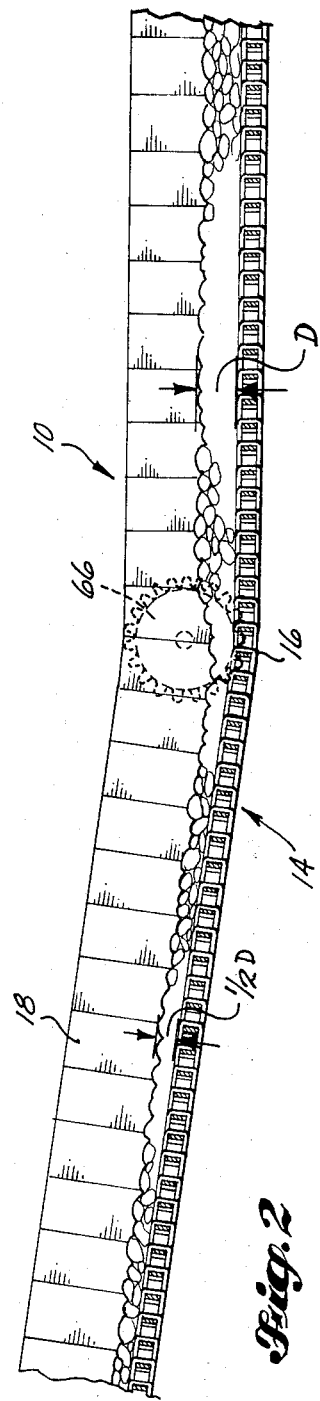
FIG. 2 is an enlarged fragmentary view of the conveyor belt in the transitional region between the declining portion and horizontal run portion, showing the thinning out of the product which occurs by design in the declining portion.
Figure 3:
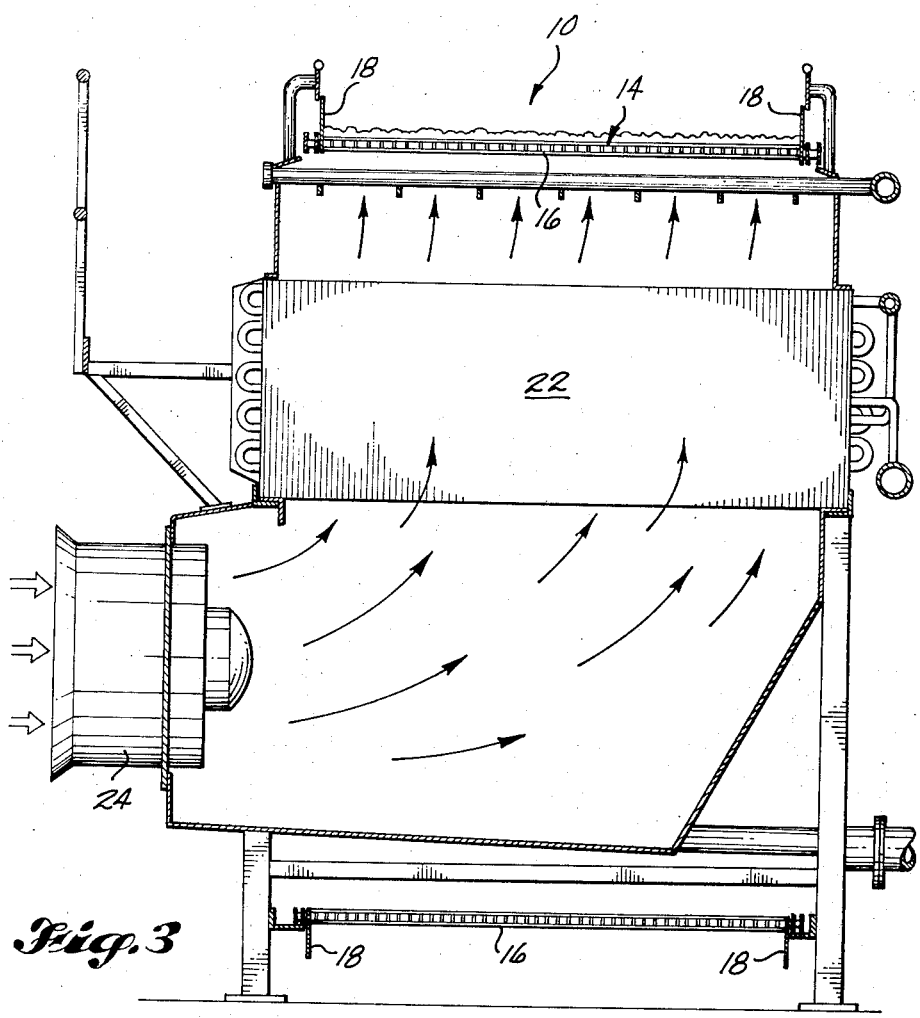
FIG. 3 is a cross sectional view through the freezer, taken substantially along line 3—3 of FIG. 1.

The fluidized freezer broadly comprises a fluidized bed 10 which is housed within a chamber or tunnel 12. The fluidized product bed 10 is formed on and by the upper run of an endless belt type conveyor 14 which includes a foramious belt 16 and generally upstanding side wall portions 18. The direction of belt travel is indicated by arrows in FIG. 1. The food particles which travel through the tunnel 12 are frozen by refrigerated air which is continuously recirculated through the bed 10 and evaporator coils 22 by a plurality of adjustable vane axial fans 24.

A feeder mechanism 20 is provided near the entrance to the tunnel 12. In accordance with established practice, the particles of food are slowly fed onto the foraminous belt 16. The belt carries them into the tunnel and over the upwardly flowing refrigerated air. The object is for the refrigerated air to suspend the particles while it freezes them. Proper suspension results in good heat exchange between the air and each particle, and also prevents the particles from freezing together. After the particles are completely frozen they are discharged into a suitable receiver 26 (which may be another conveyor) located at the discharge end of the conveyor 14. The conveyor belt 14 then moves downwardly, then back through its lower run, and then upwardly and back to the feeder mechanism 20 at the start of its upper run.

Figure 5:
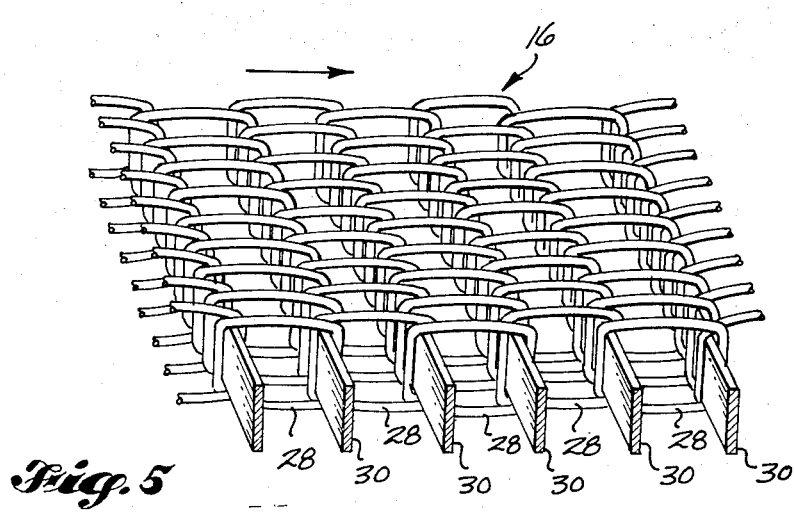
FIG. 5 is an enlarged scale fragmentary pictorial view of the conveyor belt.

The feeder mechanism 20 is preferably of the "shaker" type, i.e., it is designed to shake or vibrate a pan across which the food particles travel, so that such food particles are continuously agitated and are formed into a substantially uniform layer during their slow movement off from the pan onto the conveyor belt 16. Preferably, the foramious conveyor belt 16 is constructed from alternating right-hand and left-hand metal wire spirals, some of which are designated 28 in FIG. 5, interconnected by flat metal connecting strips 30. The flat connecting strips 30 serve to direct the cold air flow upwardly in a generally even flow pattern. The side walls 18 are formed by a plurality of panels. The panels are connected to the conveyor belt 16 in such a way that they do not empede movement of the belt 16 around any of the sprockets 38, 40, 42, 66. This type of conveyor belt is disclosed in detail in U.S. Pat. No. 3,263,799, granted Aug. 2, 1966 to R. E. Bascom et al. Such a conveyor belt is currently being manufactured by United States Steel under the trade name USS Baffle - Flo, a trademark of United States Steel.

For several reasons it is desirable to freeze the food particles in a manner such that each particle is separate and free of the others, with a coat of frozen surface moisture enveloping each particle. In this state, the packaging of the food particles is greatly simplified. Further, the consumer is able to unpackage the food particles or pour the desired portion from the package with ease. With regard to the quality of food itself, a thin coat of ice about each particle acts to preserve the proper moisture content within the food particle. Another reason for keeping the particles separate during freezing is that the freezing process itself is greatly facilitated. The freezing must be accomplished by exposing the food particles to the refrigerated air. If the particles are not kept separate during freezing, they will freeze together into clumps. If this happens the refrigerated air is precluded from reaching the unexposed food particles in the centers of the clumps. The rate of heat transfer from such unexposed particles is significantly reduced. Complete freezing of all food particles would necessitate an undesirable lengthening of the exposure time of the food particles to the refrigerated air.

According to the present invention, the chances of an immediate fluidization of all food particles are enhanced in a quite simple but yet effective way. The upper run of the conveyor 14 is divided into a declining first section and a substantially horizontal second section. In the first section gravity forces combine with the fluid forces to cause good food particle movement so that it is less likely that the food particles will stay in contact with each other and freeze together or "cake." The downhill movement of the food particles in the declining section of the bed causes a thinning of the product bed, preferably to about one half of the normal depth D of the bed, thus reducing the amount of fluid pressure required to cause fluidization. At the end of the declining section, the velocity of each food particle is reduced back to the velocity of the moving conveyor belt 14. Therefore, the depth of the bed increases back to the normal depth. However, from this point on, fluidization is easy to maintain because the surface water on the product has frozen and there is now no tendency for the food particles to freeze together. Also, from this point om the velocity of the refrigerated air can be reduced proportionately to the dimenishing density of the food product.

By way of example, in a typical installation the air is chilled by the first evaporator 22–1 down to about five degrees farenheit. The fan 24–1 which delivers air upwardly through the declining section of the fluidized bed 10 is adjusted to delvier air at a velocity of about 980 feet per minute, measured above the bed. The chosen angle of decline is that angle which will result in the acceleration attributable to gravity working to thin the product bed 10 from a normal depth of about 2 inches down to a depth of about one inch throughout the declining section. Such thinning reduces the static pressure required to support fluidization in such declining section from about one and one-fourth inches of water gage to only about sixty-two hundreds of an inch of water gage. In the substantially horizontal section of the fluidized bed 10 the depth of the fluid product increases back to about 2 inches. The velocity of air delivered through the downstream end portion of the fluidized bed 10 may be as low as about 500 feet per minute (measured above the product bed 10).

Figure 4:
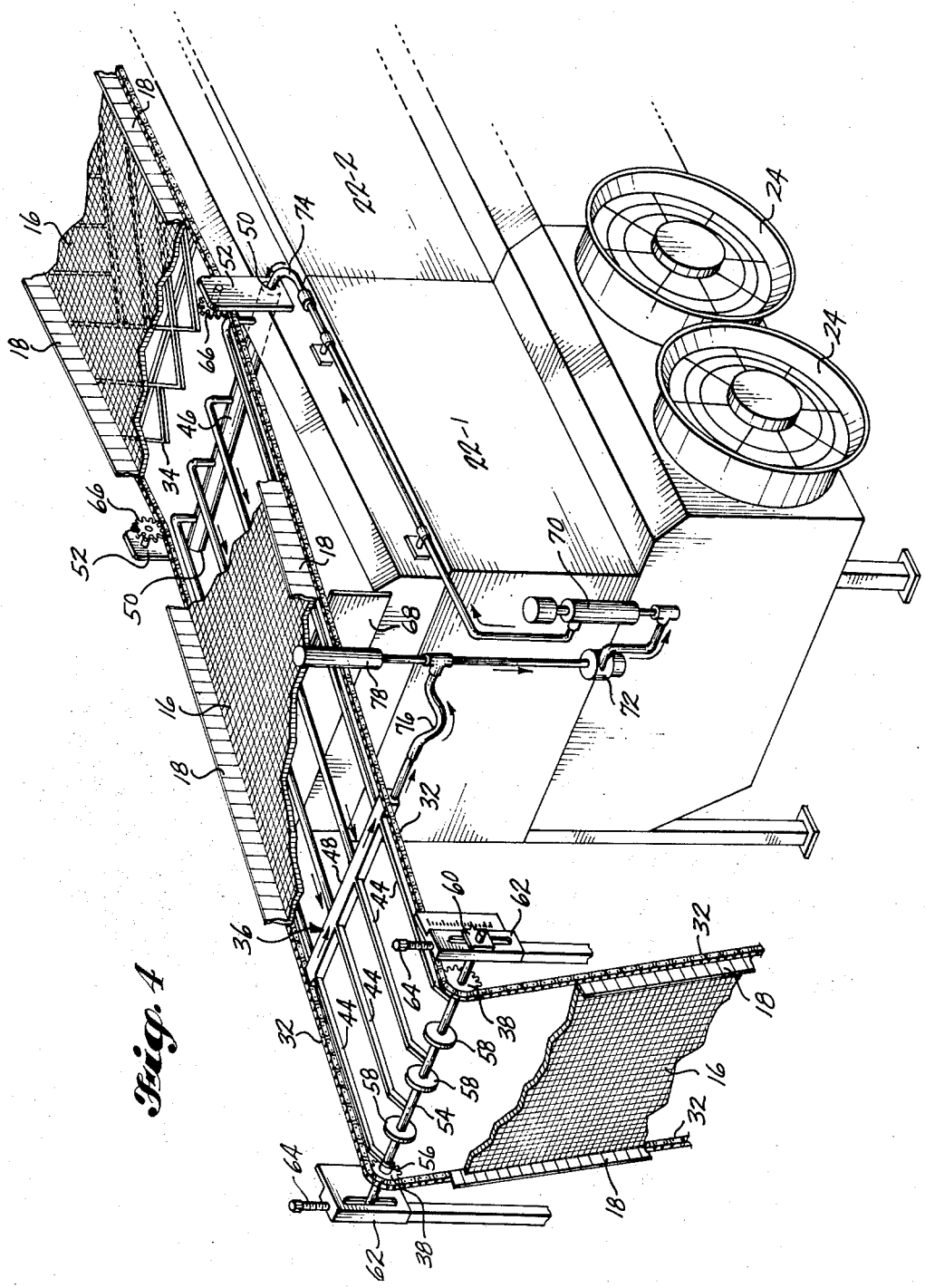
FIG. 4 is a fragmentary isometric view of the declining portion of the conveyor, showing the adjustable support structure for the conveyor belt.

As best shown by FIG. 4, a drive chain 32 extends along each side of the conveyor belt 16 and is attached thereto. In the upper run of the conveyor 14 the conveyor belt 16 is supported on and by frames 34, 36. In the lower run of the conveyor 14 the chains 32 pass over and are supported by idler sprockets, some of which are designated 38. The chains 32, and hence the conveyor 14, are driven by a motor (e.g., a hydraulic motor) which is drivenly connected to a drive sprocket 40. An adjustable idler sprocket 42 is provided for controlling the amount of slack in the belt 16.

According to an aspect of the invention, the declining section of the conveyor 14 is provided with an adjustable undersupport or frame 36 (FIG. 4). Frame 36 comprises longitudinal support rails 44 and transverse members 46, 48. Transverse member 46 is provided with journals 50 at its ends which serve to pivotally attach the downstream end of frame 36 to support plates 52 which in turn are connected to the main frame. The opposite or upstream end of the adjustable undersupport frame 36 carries a shaft 54 which rotates in journals 56. Journals 56 are carried by the upstream ends of the outside pair of rails 44. Shaft 54 carries an idler sprocket 38 for each chain 32 and a plurality of support rollers 58 for supporting the conveyor belt 16 between the sprockets 38. Preferably one such sprocket 38 is fixed to the shaft and the other is free running, to compensate for unequal wear in the two chains. The sprocket 38 that is fixed to the shaft transmits power to the supporting wheels 58 which in turn drive the belt 16 by friction. This is done to reduce the tendency of the belt 16 to lag behind the side chains 32.

The two ends of the support shaft are connected to slide blocks 60 which are adjustably mounted in vertically extending slideways 62. An adjustment screw is provided for each block 60. When the screws 64 are turned clockwise they thread themselves downwardly into internally threaded upper end portions of the slideways 62 and move the slide blocks 60 and hence the forward end portion of the adjustable undersupport 36, downwardly with them. Rotation of the adjustment screws 64 in the opposite or counterclockwise direction raises the blocks 60 and hence raises the upstream end of the undersupport 36. The take up sprocket 38 is adjusted as necessary to permit the upstream end of the undercarriage to be moved upwardly or downwardly. Another suitable form of adjustment mechanism is disclosed by U.S. Pat. No. 2,443,267, granted June 15, 1948, to Gomer F. Owens. By way of example, the adjustment mechanism 60, 62, 64 may be designed to shift the shaft 54 in position a maximum of nine inches and may be provided with a travel indicator. A zero reading on the indicator would mean that the conveyor is level.

A pair of idler sprockets 66 are mounted to engage the drive chains 32 at points substantially directly above the journaled ends of the downstream cross member 46. These sprockets 66 hold the chains 32 down at such points and serve to establish the ending of the declining section of the conveyor 16 and the start of the substantially horizontal section.

A short wall 68 depends below the undersupport 36 to function as a movable seal for preventing air loss between the top of the evaporator 22–1 and the declining section of the conveyor 14.

Preferably undersupport 36 is heated. This is done to prevent ice build up from moisture being carried into the freezer tunnel by the incoming food particles on moving belt 16. In the illustrated embodiment the cross members 46, 48 and the portions of the longitudinal members 44 which extend between members 46, 48 are made from tubular material and are interconnected. A heated liquid is circulated through such members 46, 48, 44 to heat them and prevent ice build up. The liquid may be electrically heated in a thermostatically controlled electric heater 70. A pump 72 is provided for pumping the liquid from the tube 48 back to the heater 70 and from the heater 70 into tube 46 which functions as a warm liquid distribution manifold. The warm liquid flows from manifold 46 through the tubular members 44 and then into the tubular member 48 serves as a cool liquid return manifold. The tubular portions of members 44 and the return manifold 48 make direct contact with the conveyor belt 16 and transfer heat to it. A swivel joint is provided where the conduit 74 enters the end of warm liquid distribution manifold 46. A flexible section of tubing 76 is connected between the outlet from cool liquid return manifold 48 and the inlet pipe for the pump 72. The fluid system includes an expansion chamber 78 which is open to the atmosphere so that the heated liquid within the supporting frame 36 is under no pressure.

The undersupport 36 extends into the freezer tunnel a sufficient distance to prevent ice build up from the moisture carried into the freezer by wet vegetables. Thus, it should serve to prevent ice build up with almost any food product, because wet vegetables are amongst the foods which contain the greatest amount of moisture.

The frame 34 which supports the conveyor belt 16 in the substantially horizontal section of the upper run is not heated.

The construction herein described and illustrated is a preferred embodiment of the invention. As many changes could be made in this construction without departing from the invention as defined by the appended claims, it is intended that the description and drawings shall be interpreted as illustrative and not in a limiting sense, and that the scope of the invention be limited only by such claims.

What is claimed is:

1. In a freezer of the type in which food particles to be frozen are delivered onto the upper run of an endless, foraminous conveyor belt and are carried by said belt through a freezing zone while refrigerated air is blown upwardly through the belt and the food particles thereon, the improvement comprising:

support frame means for the upper run of the conveyor belt, establishing a first declining section of the conveyor belt followed by a second substantially horizontal section of the conveyor belt; and means for depositing a food product to be frozen onto a relatively upper portion of the declining section of the conveyor belt, with the angle of decline being sufficient to cause the food particles to advance faster than the conveyor belt, resulting in a substantial thinning in the product bed in the declining section of the fluidized bed.

2. The improvement of claim 1, including a drive chain extending along each side of the conveyor belt, and a pair of sprocket wheels supported above said chains, said sprocket wheels engaging said chains where the declining section ends and the substantially horizontal section begins.

3. The improvement of claim 1, wherein the support frame means for the first declining section includes an undersupport assembly for the conveyor belt having upstream and down stream ends, pivot joint means mounting the downstream end for pivotal movement about a transverse axis, and vertically adjustable support means for the upstream end of said undersupport assembly, such adjustment being for the purpose of changing the slope of the declining section of the conveyor belt.

4. The improvement of claim 3, wherein the pivot joint means is positioned to establish the transverse axis substantially vertically below the two sprocket wheels.

5. The improvement of claim 3, wherein said undersupport assembly includes a transverse support shaft at its upstream end having sprocket wheels thereon for the drive chains.

6. The improvement of claim 3, wherein the undersupport assembly for the declining section of the conveyor belt comprises tubular frame members, and means for circulating a relatively warm fluid through said tubular members for the purpose of preventing ice buildup on the undersupport.

7. The method of freezing food particles comprising:

continuously delivering food particles onto an endless, foraminous conveyor belt;

driving said conveyor belt both forwardly and downwardly while blowing refrigerated air upwardly through the belt and the food particles thereon, to fluidize the food particles and enhance the heat exchange contact between them and the refrigerated air;

controlling the downward travel of the belt to cause the food particles to advance faster than the belt to in that manner cause a thinning of the fluidized food particle bed; and following surface freezing of the food particles, driving the conveyor belt substantially horizontally, to remove the gravity forces from the food particles, to in that manner increase the depth of the fluidized food particle bed, while continuing to deliver refrigerated air upwardly through the conveyor belt and the food particles thereon.

* * * * *